United States Patent
Berning et al.

(10) Patent No.: US 10,156,046 B2
(45) Date of Patent: Dec. 18, 2018

(54) PLANNING SYSTEM AND METHOD FOR COORDINATING ROAD MILLING TASKS

(71) Applicant: Wirtgen GmbH, Windhagen (DE)

(72) Inventors: Christian Berning, Zülpich (DE); Sebastian Hofrath, Hennef (DE); Cyrus Barimani, Königswinter (DE)

(73) Assignee: Wirtgen GmbH (DE)

( * ) Notice: Subject to any disclaimer, the term of this patent is extended or adjusted under 35 U.S.C. 154(b) by 0 days.

(21) Appl. No.: 15/427,472

(22) Filed: Feb. 8, 2017

(65) Prior Publication Data
US 2017/0233955 A1 Aug. 17, 2017

(30) Foreign Application Priority Data
Feb. 15, 2016 (DE) .......................... 10 2016 102 568

(51) Int. Cl.
*E01C 11/00* (2006.01)
*E01C 19/02* (2006.01)
(Continued)

(52) U.S. Cl.
CPC ............ *E01C 11/005* (2013.01); *E01C 19/02* (2013.01); *E01C 19/05* (2013.01);
(Continued)

(58) Field of Classification Search
CPC ........ E01C 11/005; E01C 19/02; E01C 19/05; E01C 19/1004; E01C 23/065; E01C 23/088; E01C 23/12; E01C 23/127
See application file for complete search history.

(56) References Cited

U.S. PATENT DOCUMENTS

| 4,006,936 A | 2/1977 | Crabiel et al. |
| 4,655,634 A | 4/1987 | Loy et al. |
| (Continued) | | |

FOREIGN PATENT DOCUMENTS

| AT | 382683 B | 3/1987 |
| CN | 101666622 A | 3/2010 |
| (Continued) | | |

OTHER PUBLICATIONS

European Search Report of European Patent Application EP 16202024.2, dated Jul. 11, 2017, 11 pp (not prior art).
(Continued)

*Primary Examiner* — Dale W Hilgendorf
(74) *Attorney, Agent, or Firm* — Lucian Wayne Beavers; Gary L. Montle; Patterson Intellectual Property Law, PC

(57) ABSTRACT

The invention relates to a planning system and method for operating one or more road milling machines. In that context, material properties of a road are captured and are geographically associated with one or more roads or road segments. Based on the material properties, an expected milling output of a road milling machine is ascertained, in the context of carrying out milling tasks on the road, or an expected wear on the milling tools. An optimized sequence of milling tasks to be carried out is created on the basis of those data. Accordingly, the invention may enable optimized deployment of the one or more road milling machines and of resources necessary for carrying out the road milling tasks. Aspects of the planning system may be remotely implemented for centralized application with respect to each of the road milling machines, or locally implemented for individual road milling machines.

26 Claims, 3 Drawing Sheets

(51) Int. Cl.
*E01C 19/05* (2006.01)
*E01C 19/10* (2006.01)
*E01C 23/06* (2006.01)
*E01C 23/088* (2006.01)
*E01C 23/12* (2006.01)
*G06Q 10/06* (2012.01)

(52) U.S. Cl.
CPC ........ *E01C 19/1004* (2013.01); *E01C 23/065* (2013.01); *E01C 23/088* (2013.01); *E01C 23/12* (2013.01); *E01C 23/127* (2013.01); *G06Q 10/06311* (2013.01)

(56) References Cited

U.S. PATENT DOCUMENTS

| | | |
|---|---|---|
| 6,201,567 B1 | 3/2001 | Kuroda |
| 6,887,013 B2 | 5/2005 | Ley et al. |
| 6,990,390 B2 | 1/2006 | Groth et al. |
| 7,422,391 B2 | 9/2008 | Holl et al. |
| 7,905,682 B2 | 3/2011 | Holl et al. |
| 8,177,871 B2 | 5/2012 | Soma et al. |
| 8,386,196 B2 | 2/2013 | Wagner et al. |
| 8,757,730 B2 | 6/2014 | Wachsmann et al. |
| 8,775,099 B2 | 7/2014 | Wagner et al. |
| 9,689,120 B2* | 6/2017 | Gaertner et al. ...... E01C 23/088 |
| 2005/0207841 A1 | 9/2005 | Holl et al. |
| 2008/0153402 A1 | 6/2008 | Arcona et al. |
| 2013/0035874 A1 | 2/2013 | Hall et al. |
| 2013/0035875 A1 | 2/2013 | Hall et al. |
| 2013/0128279 A1 | 5/2013 | Wachsmann et al. |
| 2014/0116776 A1 | 5/2014 | Marx et al. |
| 2014/0324364 A1 | 10/2014 | Wagner et al. |
| 2015/0149027 A1* | 5/2015 | Paulsen et al. ....... E01C 23/088 701/29.4 |
| 2015/0197253 A1* | 7/2015 | Zhu .................. E01C 23/01 702/81 |
| 2015/0227120 A1* | 8/2015 | Laux et al. ........... E01C 23/088 700/160 |
| 2015/0275443 A1* | 10/2015 | Schlenker et al. .... E01C 23/065 404/84.05 |
| 2017/0009578 A1 | 1/2017 | Barimani et al. |
| 2017/0102283 A1* | 4/2017 | Marsolek ............. E01C 23/088 |

FOREIGN PATENT DOCUMENTS

| | | |
|---|---|---|
| CN | 101745874 A | 6/2010 |
| DE | 3136434 A1 | 3/1983 |
| DE | 3411892 A1 | 10/1985 |
| DE | 3218754 C2 | 11/1985 |
| DE | 3505408 A1 | 8/1986 |
| DE | 3616170 A1 | 3/1987 |
| DE | 3818213 A1 | 11/1989 |
| DE | 10015005 A1 | 10/2001 |
| DE | 10203732 A1 | 8/2003 |
| DE | 102005016346 B3 | 1/2007 |
| DE | 102008045470 A1 | 3/2010 |
| DE | 102010014903 A1 | 10/2011 |
| DE | 102013112972 A1 | 5/2015 |
| EP | 1039036 A2 | 9/2000 |
| EP | 1396581 B1 | 10/2008 |
| EP | 2887049 A1 | 6/2015 |
| EP | 3115507 A1 | 1/2017 |
| JP | 941863 C | 2/1979 |

OTHER PUBLICATIONS

Caterpillar Operation & Maintenance Manual, PR-1000 Pavement Profiler, Jul. 1990, 78 pages.
ARRA Basic Asphalt Recycling Manual, U.S. Department of Transportation Federal Highway Administration, 108 pages, 2001.
Liang et al., Vision-Based Automatic Tool Wear Monitoring System, Jun. 25-27, 2008, Proceedings of the 7th World Congress on Intelligent Control and Automation, Chongqing, China, pp. 6031-6035.

* cited by examiner

PLANNING SYSTEM AND METHOD FOR COORDINATING ROAD MILLING TASKS

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of German patent application 10 2016 102 568.2, filed Feb. 15, 2016, and which is hereby incorporated by reference.

BACKGROUND OF THE INVENTION

Road milling machines with which one, several, or all layers of a road can be removed by milling, are used nowadays to remove traffic surfaces, for example roads, road segments, or parking lots. The milling output achievable with a respective road milling machine, for example the milling area achievable per unit time or the milling volume achievable per unit time, depends greatly on the material properties of the traffic surface to be processed. The wear on the milling tools is also influenced directly by the material properties of the road or road segment. These relationships make it difficult to plan machine deployment for pending road milling tasks. The result can be that more resources than necessary, in terms of time, machinery, or materials, are provided for a road milling task, leading to elevated costs. Insufficient resources can likewise be allocated, which can result in delays. This becomes negatively evident in particular in a context of successively scheduled milling tasks, and can result in large consequential losses, for example if subsequent processing steps cannot be executed or are executed late.

The document DE 10 2013 112 972 A1 discloses a method for wear prognosis for an earth working machine, in particular a road milling machine. Here the current wear state of a bit or a bit holder is captured, and a residual wear capacity is ascertained from the current wear state. From that capacity, the remaining working output until the tools have reached their wear limit, for example in the form of a mass still millable, or a milling volume, or a remaining work time, can be ascertained. The material properties of the substrate to be processed can also be considered in determining the remaining working output. Those properties can be deduced, for example, by taking samples or on the basis of machine parameters of the earth working machine which are established in the context of milling.

US 2015/0197253 A1 discloses a system that, in the context of processing of a ground surface, for example a road, with an earth working machine, ascertains the quality of a working step in positionally resolved fashion and displays it graphically. The quality of a processed road segment can be ascertained and evaluated using suitable sensors on the road construction machine and by comparison with specified values. The positionally resolved graphic depiction allows an operator of the road construction machine to rework individual road segments in targeted fashion. Ground irregularities caused by "jumps" of the earth working machine can represent, for example, a quality feature.

BRIEF SUMMARY OF THE INVENTION

An object of the invention is to furnish a method, a control device, and a computer program product that enable optimized deployment of road milling machines and of the resources necessary for carrying out road milling tasks.

An object of the invention is achieved by a method for operating one or more road milling machines, encompassing at least the following steps:
- determining and/or reading in material properties of roads and/or road segments, and/or characteristic values correlating with the material properties;
- associating the material properties and/or the characteristic values with respectively pertinent road designations and/or designations of road segments and/or geographic coordinates;
- specifying at least two roads and/or road segments to be processed by milling;
- ascertaining at least one expected milling output of the road milling machine for the roads and/or road segments to be processed, based on the material properties and/or characteristic values determined for the roads or road segments;
- ascertaining and displaying a sequence, optimized at least with regard to milling output, of the road milling tasks that are to be carried out.

For purposes of the invention, the terms "road" and "road segment" encompass any forms of paved traffic routes and traffic surfaces, i.e. including parking lots, sidewalks, bicycle paths, or the like.

With suitably selected machine parameters of the road milling machine, the achievable milling output of a road milling machine is defined substantially by the material properties of the road or road segment to be removed. If the material properties of the road or road segment are known, or if the characteristic values that correlate with those material properties are known, it is thus possible to arrive at a forecast of the achievable milling output. This forecast is valid for suitably selected machine parameters. If the milling output is known, exact planning of pending milling tasks can be accomplished. In particular, the sequence of different milling segments within a construction site, or the sequence of different road milling tasks at different construction sites, can be optimally specified. Optimization preferably can be accomplished with regard to a required working time and/or the required resources. It is furthermore possible to mutually coordinate the deployment of multiple road milling machines.

The method thus enables optimum operation of one or more road milling machines with regard to their working output and the resources needed in order to operate them. Total costs, in particular for carrying out several successive milling tasks, can thereby be appreciably reduced.

According to one embodiment of the invention, provision can be made that a working time span and/or an operating supplies consumption and/or a wear on at least one tool of the road milling machine and/or a quantity of required consumable parts and/or a quantity of required operating supplies and/or a quantity of required operating auxiliaries for carrying out a specified road milling task is determined on the basis of the material properties and/or characteristic values associated with a road or road segment to be processed, and is displayed, and/or is taken into consideration in ascertaining the sequence of the road milling tasks to be carried out. In particular, given a known working time span, two or more milling tasks to be carried out can be optimally coordinated with one another in terms of their execution. In addition, simultaneous deployment of several road milling machines can be coordinated. Cost-intensive road milling machine downtimes and waiting times can thereby be very largely avoided. If the wear on the milling tools is known, pending milling tasks can be scheduled in such a way that, for example, necessary tool changes occur at road milling machine downtimes that are necessary in any case, for example after completion of a milling task.

Regardless of the method selected for determining the characteristic values correlating with the material properties, provision can be made that the material properties for a road or road segment are determined from the characteristic values. Based on the material properties, for any road milling machine it is then possible to make a forecast, matched to its properties, for the milling output, the wear on the milling tools, and the required consumption of material and resources.

The milling output of a road milling machine, the wear on its milling tools, and the required material resources and consumable resources can be forecast with sufficient accuracy, for example, if an abrasiveness and/or a hardness and/or a material type and/or a material composition and/or a temperature and/or a layer structure of the road or road segment is determined as a material property.

The milling output of the road milling machine, the wear on its milling tools, and the required material resources and consumable resources can furthermore be accurately forecast by the fact that at least one machine parameter of a road milling machine which is obtained for execution of a milling task to be planned is determined as a characteristic value correlating with the material properties.

For determination of the material properties provision can be made, for example, that during a first milling process that is carried out within a working sector to be processed, a milling depth and/or an advance of the road milling machine and/or a milling drum rotation speed of a milling drum of the road milling machine and/or a torque transferred to the milling drum and/or a drive power transferred to the milling drum or an operating supplies consumption is determined as a machine parameter. For a specified milling depth, a specified advance, and a specified milling drum rotation speed, for example, a necessary torque to be transferred to the milling drum will result as a function of the existing material properties of the road or road segment to be milled. A higher torque will be required for a harder road than for a softer road. The material properties of the road or road segment can thus be inferred based on the machine parameters or combination of those machine parameters that are set and that result. The machine parameters or the material properties derived therefrom can be ascertained, for example, during a first milling process on a road or road segment. Based on the material properties, or the machine parameters constituting characteristic values correlating with the material properties, that are thereby obtained, a forecast can then be created for the milling output, the wear on the milling tools, or the required utilization of materials and resources for a further milling deployment in the working sector within which the material properties can be assumed to be identical or similar to those in the segment already milled. For example, in the case of a multi-lane roadway it is usual firstly to mill off one lane and to process the additional lanes later. It can be assumed, for the lanes yet to be processed, that the material properties are the same as those ascertained based on the machine parameters upon milling of the lane already processed. The previously ascertained machine parameters, and the material properties derived therefrom, can therefore be used for the process of planning work on the remaining lanes.

The accuracy of the determination of material properties from the machine parameters of a road milling machine in the context of a previously executed milling procedure in the work sector to be planned can be improved by taking into consideration, in determining the material properties from the machine parameters, a wear that has occurred on at least one tool of the road milling machine in the context of milling a specific area. By evaluating the machine parameters and the wear together, it is possible to infer with high accuracy the material properties of the substrate being processed.

According to a variant embodiment of the invention, provision can be made that position data of a road milling machine are captured and are associated with the determined material properties and/or characteristic values. For example, during a milling process on a road segment, the material properties or the characteristic values can be associated unequivocally and, for example, automatically with the pertinent position data. The material properties or characteristic values thereby obtained can then be used for further construction site planning in the respective working sector. During a planning process, the pertinent material properties and characteristic values for the road or road segment on which the road milling machine has already worked can be retrieved on the basis of the position data of the road milling machine. The forecast of the milling output, wear, or material and resource consumption can then be made based respectively on those material properties or characteristic values. A procedure of this kind is advantageous, for example, in the context of a decentrally arranged planning system, in which planning of a milling task to be carried out is accomplished directly on site at at least one of the road milling machines that is provided.

It is furthermore conceivable for the material properties and/or the characteristic values correlating with the material properties to be determined from the process of installing the road or road segment. Based on the machines, materials, and process parameters used when the road or road segment was installed, the material properties required for a subsequent milling process can be ascertained and stored in positionally resolved fashion or for a specified working sector. Those material properties, or ones derived therefrom, can then be returned to when the road or road segment is subsequently removed by milling. It is particularly advantageous in this context that a separate determination of the material properties of a road or road segment to be processed does not need to be made prior to planning of a milling task that is to be carried out.

In accordance with a possible variant embodiment of the invention, provision can be made that measured data ascertained with a measurement system are determined as characteristic values correlating with the material properties. The measurement system can determine, for example, the hardness of a road surface or the layer structure of a road. It is likewise conceivable to carry out suitable measurements on drill cores of previously executed test holes. The measured data can then be associated with the pertinent road, the pertinent road segment, or a pertinent sector. The measured data can directly represent the necessary material properties, or the material properties can be ascertained from the measured data.

In accordance with another variant embodiment of the invention, provision can be made that transport times of the road milling machine between the roads and/or road segments to be processed, and/or maintenance intervals of the road milling machine, are taken into consideration in the specification of the sequence of road milling tasks. This measure allows downtimes of the road milling machine to be avoided or at least reduced, with the result that total costs for the milling tasks to be carried out can be lowered.

Optimized construction site planning can be achieved by the fact that a milled area and/or a milled volume and/or a milled mass and/or a milled distance, referred in each case to a time unit, is determined as a milling output. The necessary work quantity, for example in the form of an area to be milled, a volume to be milled, a mass to be milled, or a distance to be milled, is known in the context of planning a milling project. Once the milling output is ascertained based on the material properties of the road or road segment, then, for example, the time span for carrying out the milling project can be determined based on the work quantity and the milling output. Necessary downtimes of the road milling machine can be taken into consideration in this context. For a known wear on the milling tools, e.g. referred to a work quantity or a deployment time, it is possible, for example, to forecast and correspondingly take into consideration necessary road milling machine downtimes for replacement of the milling tools. The sequence of milling tasks to be carried out in succession, including using several road milling machines, can thereby be optimally coordinated. It is also conceivable to capture and store the work quantity for processing a road or road segment in the context of the method, so that it can be returned to during the planning phase. For example, the work quantity can already be captured and stored during installation of a road or road segment.

An object of the invention is furthermore achieved by a planning system for coordinating road milling tasks for one or more road milling machines, the planning system comprising a memory networked with input and output units associated with the one or more road milling machines, and a medium having a computer program product stored thereon, the program product executable by a computer to carry out the above-described method.

In an embodiment, the computer program product can be loaded directly into the internal memory of a digital computer.

In an embodiment, the computer program product can be stored on a medium that is insertable into a computer.

In an embodiment, the computer can be integrated into a control device or can be part of the control device.

DETAILED DESCRIPTION OF THE INVENTION

Figure 1:
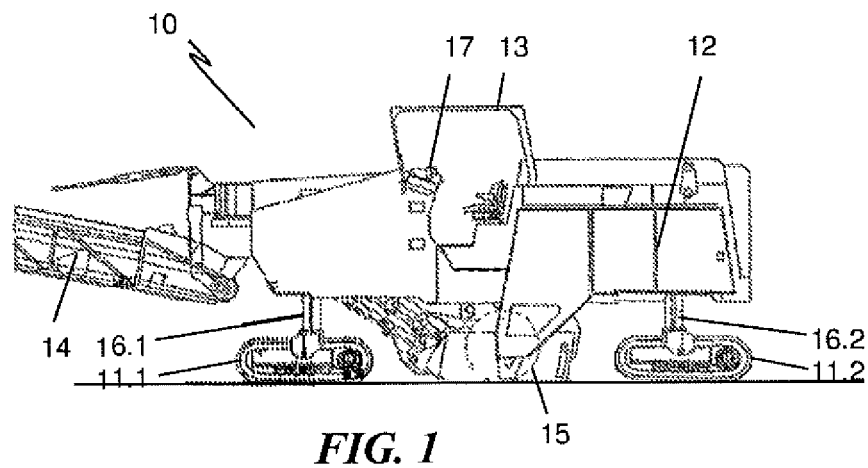
FIG. 1 is a schematic side view depicting a road milling machine.

FIG. 1 is a schematic side view depicting a road milling machine 10. A machine frame 12 is carried, vertically adjustably via four lifting columns 16.1, 16.2, by propelling units 11.1, 11.2, for example tracked propelling units. Road milling machine 10 can be operated from a control stand 13 via a control system 17 arranged in control stand 13. A milling drum 15 (arranged in concealed fashion and depicted with dashed lines) is rotatably mounted in a milling drum box that is likewise arranged in concealed fashion. A conveying device 14 serves to transport away the milled material.

Figure 2:
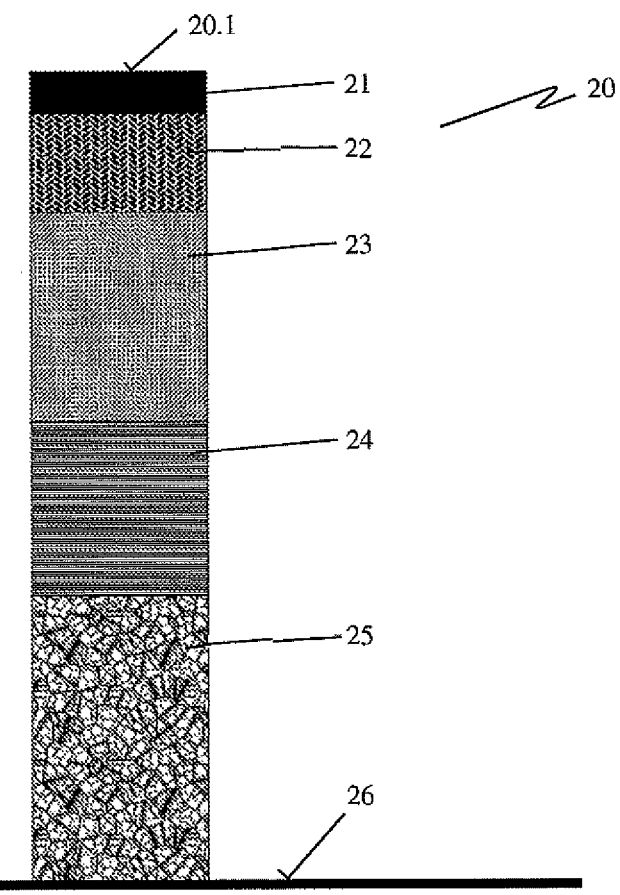
FIG. 2 is a simplified schematic depiction of an example of a structure of a road.

During use, road milling machine 10 is moved, at an advance speed entered via control system 17, over the substrate to be processed. In that context, milling tools (not depicted) arranged on the rotating milling drum 15 remove road 20 whose structure is shown in FIG. 2. The milling tools are configured as a rule as bits, preferably round-shank bits, that are installed replaceably in bit holders. Bit holder changing systems, in which the bit holders are replaceably mounted in base parts, are known and are usable in the context of the invention. The base parts are mounted on the surface of the milling drum, for example welded thereonto. The arrangement of the milling tools and bit holders can be such that one or more cutting helices are produced on the surface of the milling drum. The cutting helices result in a more sequential cutting engagement of the milling tools. The cutting helices can furthermore also perform a clearing and loading function, the removed milled material being transported along the surface of milling drum 15 to an ejection position. Milling drum 15 is driven by a motor via a drive unit. The vertical position and rotation speed of milling drum 15 can be adjusted from control system 17. The milling depth is adjusted by way of the vertical position of milling drum 15. The vertical position of milling drum 15 relative to the surface to be processed can be adjusted relative to the machine frame via the vertically adjustable lifting columns 16.1, 16.2 or via a separate vertical adjustment system, depending on the type of machine. The advance speed and the milling depth ultimately determine the working output of road milling machine 10, i.e. for example a distance or area or mass removed per unit time, or a removed volume.

The working output achievable with a road milling machine 10, and the wear on the milling tools, depend greatly on the material properties of road 20 that is to be removed, for example on its hardness or abrasiveness. This complicates construction site planning with regard to the achievable milling output and thus the required working time, and the expected wear on the milling tools. Mutual coordination of milling tasks to be carried out successively is thus insufficient, which results in delays or in undesired downtimes of road milling machine 10. The quantity of materials required for the operation of road milling machine 10, for example consumable parts, operating supplies, or operating auxiliaries, cannot be forecast with sufficient accuracy. In the one case this can cause too much material to be delivered to a construction site, which is accompanied by correspondingly elevated costs. In the other case, undesired delays can occur due to insufficient availability of materials.

FIG. 2 is a simplified schematic depiction of an example of a structure of a road 20. Starting from a road bed 26, a freeze protection layer 25 and a gravel base layer 24 are provided. Built thereon are an asphalt base layer 23, a binder layer 22, and a surface course 21, which constitutes road surface 20.1. Depending on the milling work to be performed, one or more of these layers are removed with the aid of road milling machine 10.

The material properties of road 20 which are relevant in terms of milling result from the materials used, the conditions and process parameters upon installation of road 20, and the thicknesses of the individual layers. The material properties can also depend on prevailing ambient conditions, for example the ambient temperature. Relevant material properties can be an abrasiveness or hardness of road 20. These are determined by the material type, a material composition, a temperature, and/or a layer structure of road 20.

The material properties of a road structure are usually consistent over a large region. Asphalt mixtures that are as uniform as possible in quality are used, for example, upon installation of a new roadway surface. Installation is preferably accomplished in one working step, as is obligatorily necessary, for example, in the case of open-pore asphalt (OPA). A road structure thus exhibits for the most part relatively constant material properties within specific sectors, for example within an expressway segment or within a region defined by geographic coordinates. It is thus possible to associate material properties with a location or with a spatially delimited sector. The location or sector can preferably be defined by a road designation, a designation of a road segment, or by geographic coordinates. If the material properties for a road 20 are known, then according to the present invention it is possible to create, for future milling tasks on road 20, a prognosis of the working outputs of a road milling machine 10 and/or the wear on the milling tools that can be expected. These values can be taken into consideration in planning a future construction site or sites. It is thereby possible to ascertain, from the expected working output, the time required for carrying out a milling task. When the wear on the milling tools is known, the spare parts necessary for them can be determined. The operating supplies and auxiliaries that are required can likewise be ascertained. With knowledge of this data, according to the present invention a sequence of different milling tasks that are to be carried out can be ascertained and specified in optimized fashion so as to result in a minimum total outlay in terms of time and materials. Transport times for the road milling machine between various construction sites are preferably also taken into consideration. Required downtimes of road milling machine 10, for example for maintenance work that needs to be performed, can advantageously also be incorporated into construction site planning. Optimized deployment planning for one or more road milling machines 10 is thereby made possible.

Thanks to deployment planning optimized in this fashion, total costs for the milling tasks to be carried out can be appreciably reduced due to reduced downtimes of road milling machine or machines 10 as well as decreased material, storage, and transport costs.

Figure 3:
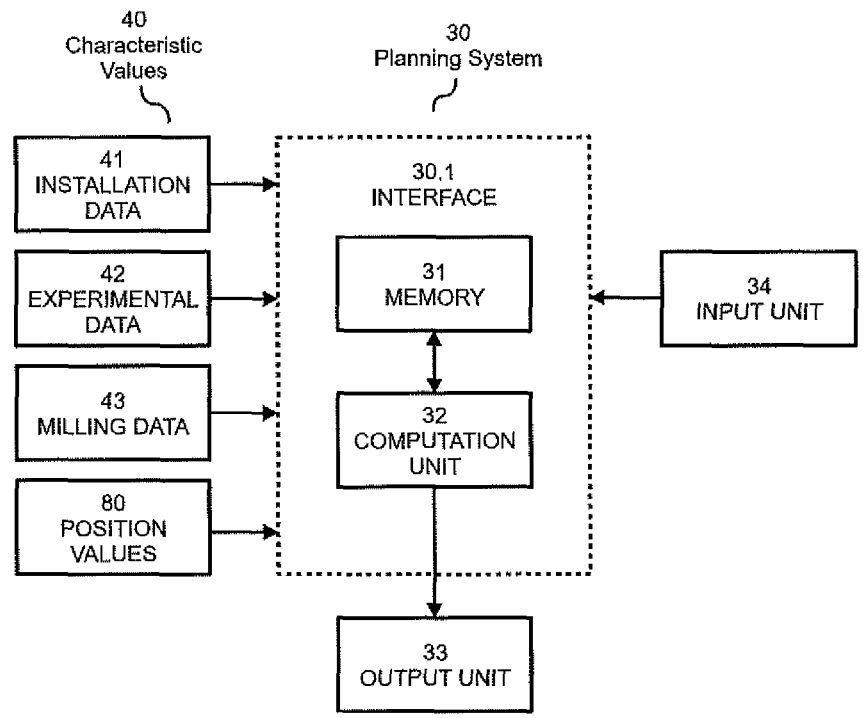
FIG. 3 is a simplified block depiction of a planning system for planning road milling tasks.

FIG. 3 is a simplified block depiction of a possible variant embodiment of a planning system 30 for planning road milling tasks. An electronic memory 31, and a computation unit 32 connected to memory 31, are associated with planning system 30. An input unit 34 and an output unit 33 are also connected to planning system 30. Planning system 30 comprises an interface 30.1 for transferring, for example, characteristic values 40 correlating with the material properties of a road 20. Interface 30.1 is designed in the present case as a radio interface. It can also be embodied, however, as a wire-based interface, for example in the form of a USB interface; or different types of interface 30.1 can be provided. Installation data 41 from the installation process of a road 20, measured and experimental data 42 for ascertaining material properties of a road 20, and/or milling data 43 of a road milling machine 10 in the context of removal of a road 20, can be read into planning system 30 via interface 30.1 as characteristic values 40 correlating with the material properties. Position data 80 can also be transferred, or material properties of a road 20 can be transferred directly, via interface 30.1 to planning system 30. Further data can preferably also be transferred via interface 30.1 to planning system 30, or outputted from planning system 30. Alternatively thereto, the aforesaid data or portions of the data (e.g. material properties, characteristic values 40, position data 80) can also be inputted via input unit 34 into planning system 30 or outputted via output unit 33. The data are stored in electronic memory 31 and managed, for example, via a database system. The pertinent position values 80 are associated with the material properties and/or characteristic values 40. Position values 80 are preferably indicated in the form of spatially delimited geographic coordinates or road designations or designations of road segments, i.e. as defined and spatially delimited working sectors. The material properties, or the characteristic values correlating therewith, can be saved simultaneously with, or with a time offset from, the pertinent position data 80.

Computation unit 32 can be configured to ascertain characteristic values 40, or the material properties directly, from installation data 41, measured data 42, and/or milling data 43.

Preferably the material properties of a road 20 are already captured as installation data (41) in the process of installing the road. The layer structure and the material composition are known in the context of the installation process, and the material properties can be deduced therefrom.

Road milling machines 10 can remove only a portion of a road surface, for example a single lane on an expressway. In some circumstances they also do not mill the entire length of the area to be processed in one working step. It may therefore happen that at a first point in time firstly a portion of an existing roadway is removed, and work at that site is not continued until a later point in time. The material properties of road 20 can be manually or automatically ascertained during the milling tasks carried out at the first point in time. For example, the material properties can be derived from milling data 43 ascertained during the milling process, for example machine parameters 74 of road milling machine 10. The material properties thereby ascertained can then be used to plan the remaining milling tasks. The prognosis, for example for the future milling output or expected wear, is made within a limited working sector in which consistent material properties of road 20 or roads 20, or of the road segments, that are to be milled can be assumed.

The working sectors can advantageously be defined and retrieved descriptively. A road designation or a designation of a road segment is preferably used for this, for example an expressway designation within a region delimited by a mileage indication.

During capture of the material properties or of characteristic values 40 correlating therewith, an operator can manually capture the pertinent working sector and store it in planning system 30. Alternatively thereto, a machine position, for example of a road construction machine upon installation of a road 20 or of a road milling machine 10 upon removal of a road, can be captured together with the material properties or characteristic values 40 obtained in that context. An operator can then define and input a working sector, around the machine position, for which the material properties or characteristic values are relevant. For the installation process, the exact position data of the installed material, and/or the pertinent process parameters, can advantageously be captured and stored in positionally resolved fashion. Here as well, the position data can be captured manually or automatically and transferred to planning system 30.

Planning system 30, or parts of planning system 30, advantageously are arranged centrally. Planning system 30 can thereby be used by different users and/or for the planning of different construction sites. A centrally arranged planning system 30 is advantageously networked with decentrally provided input and output units 34, 33. From these, planning system 30 can be accessed and the respective data capture (material properties, characteristic values 40, working sectors) or construction site planning can be carried out. Input and output units 34, 33 can be arranged for that purpose, for example, on corresponding road milling machines 10. It is also possible for only memory 31, and if applicable a database function, to be arranged centrally, and for computation units 32 as well as input and output units 33, 34 to be provided decentrally. The central or partly central arrangement of planning system 30 is advantageous in that the current data inventory exists uniformly for all users of planning system 30. Alternatively thereto, provision can be made that planning system 30 is arranged decentrally, for example on the respective road milling machines 10. Advantageously, the decentrally arranged planning systems 30 are networked or networkable with one another, so that the data stored in memory 31 can be exchanged.

The material properties can be stored directly in memory 31 for the individual working sectors. Alternatively, however, unprocessed data from the installation process, from a measurement process, and/or from a milling process can also be stored. The unprocessed data constitute characteristic values 40 correlating with the material properties. From these values the respective material properties can preferably be determined by computation unit 32 and used for the planning process. Alternatively, however, it is also conceivable for the unprocessed data (characteristic values 40) to be used directly for the planning process. For example, machine parameters 74 ascertained during a milling process, or the milling output of a road milling machine 10 produced during a working process, can be stored as characteristic values 40. Those machine parameters 74 can then be used for a planning process in the same working sector. Advantageously, the material properties therefore do not need to be ascertained from machine parameters 74. Machine parameters 74 are preferably used for planning processes for road milling machines 10 of the same type as road milling machine 10 with which machine parameters 74 were ascertained. Also conceivable, however, is a transfer to road milling machines 10 of another type; here the differing output data of road milling machines 10 need to be taken into consideration.

Positional association of the captured material properties or characteristic values 40 can be accomplished automatically upon capture of the data, for example with a GPS system. Alternatively thereto, the captured material properties or characteristic values 40 can also be associated with manually determined working regions. This can occur immediately during capture, or with a separation in time therefrom. For example, it is possible to capture and store the installation data during installation of a road. The data can then be transferred to planning system 30, for example by data telecommunication or by means of a mobile data medium, and stored in memory 31. Association of the pertinent working sector can then be carried out subsequently at planning system 30.

Figure 4:
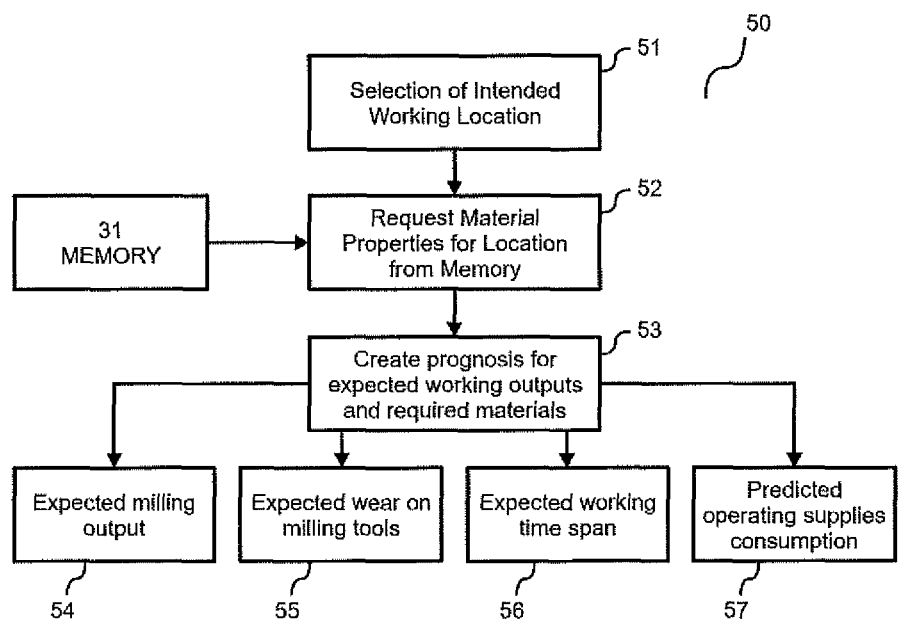
FIG. 4 is a block depiction of individual method steps during a planning phase.

FIG. 4 is a block depiction, in the form of a flow chart 50, of one possible embodiment of individual method steps during a planning phase of road milling tasks that are to be carried out. Associated with flow chart 50 are, in sequence, a first block 51, a second block 52, and a third block 53. Third block 53 is connected to a fourth block 54, a fifth block 55, a sixth block 56, and seventh block 57.

In first block 51, a selection of the intended working location is made. This can be done, for example, by inputting a working sector into planning system 30 by means of input unit 34 shown in FIG. 3. The working sector can be characterized by spatially delimited geographic coordinates or by a unique designation of a road 20 or road segment. In second block 52, the material properties for the working sector are requested from memory 31. Planning system 30 preferably has for that purpose a suitable database for managing the stored data. Based on those material properties, in third block 53 planning system 30 creates, for the working sector specified in first block 51, a prognosis for the expected working outputs and required materials. In the exemplifying embodiment shown, an expected milling output is outputted for this purpose in fourth block 54. The milling output can be, for example, a distance or area to be milled per unit time. The milling output can also be indicated by way of a volume to be milled or a mass to be milled. In the exemplifying embodiment shown, an expected wear on the milling tools is also ascertained based on the material properties, and indicated in fifth block 55. The wear can be indicated, for example, in the form of a wear rate, for example a change in a bit length or bit volume per unit time, or also with reference to a milling work that has been carried out. The latter would be, for example, a change in a bit length or bit volume per milled mass, per milled volume, or per milled distance or area. It is also conceivable to predict the number of tool changes required during the milling task that is to be planned. As a result, advantageously, the necessary spare parts for a construction site can be furnished. An expected working time span for carrying out the milling task is preferably also ascertained, as provided for in sixth block 56. In accordance with seventh block 57, provision is advantageously made to predict an operating supplies consumption of road milling machine 10. With knowledge of these and, as applicable, further expected milling and consumption data, optimized construction site planning can be effected. This relates on the one hand to the furnishing of requisite materials, in particular spare parts, operating supplies, and operating auxiliaries. On the other hand, optimized time-related deployment planning for road milling machine 10 or several road milling machines 10 can be accomplished based on the expected working time span and milling output. This is advantageous in particular when planning successive tasks at several working locations, since it is thereby possible to plan an optimized construction site sequence and to reduce downtimes for road milling machine(s) 10.

Figure 5:
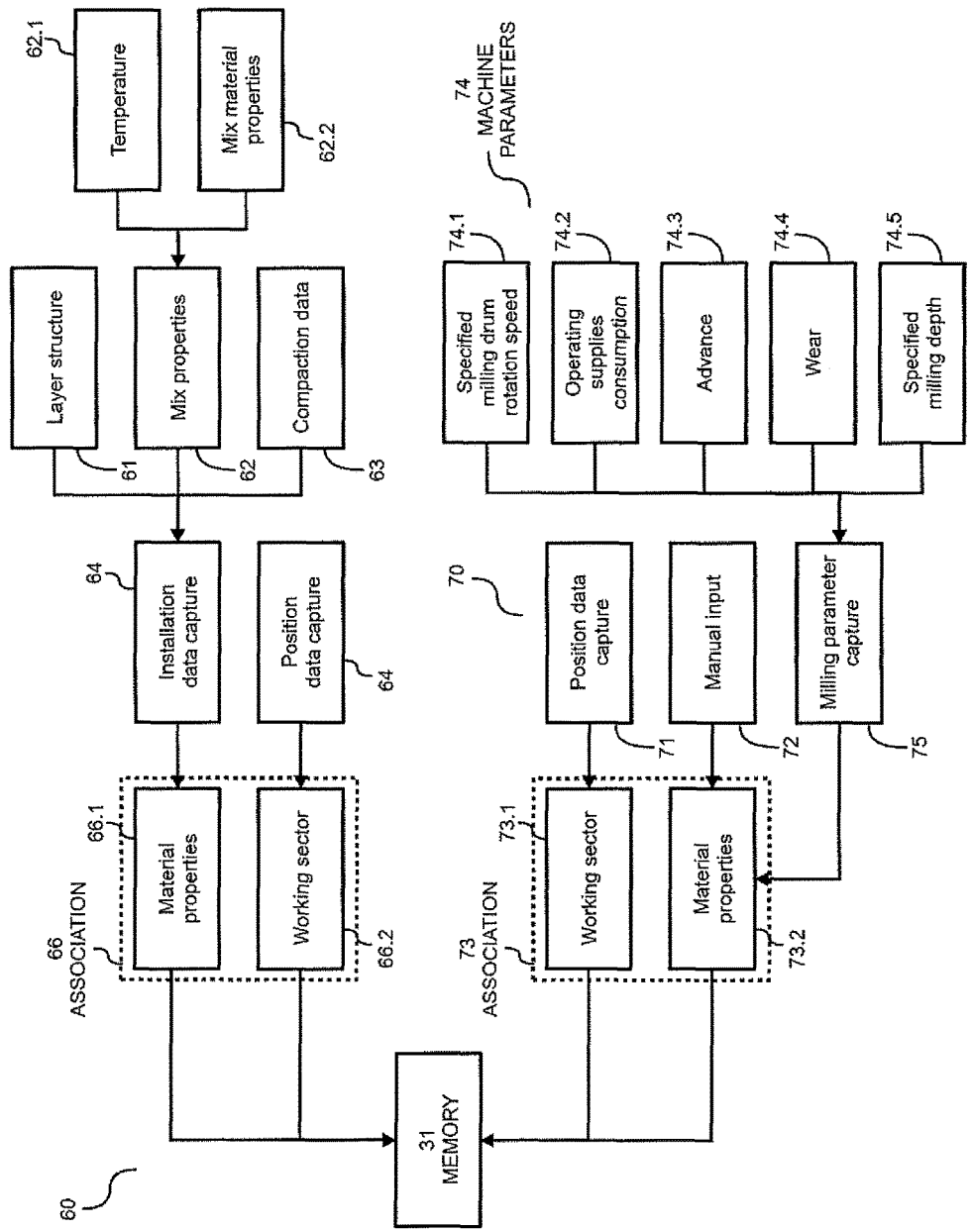
FIG. 5 is a block depiction of individual method steps during a data capture phase.

FIG. 5 is a block depiction of individual method steps during a data capture phase.

An "installation process data capture" branch 60 represents the ascertaining and storage of material properties during the process of installing a road 20. A layer structure 61, mix properties 62, and compaction data 63 are conveyed to an "installation data capture" block 64. A temperature 62.1 of the mix, as well as mix material properties 62.2 of the mix itself or of the components of the mix, are taken into consideration in the indication of mix properties 62. The composition of the mix is preferably also incorporated in this context. The position data pertinent to the installation data are captured in a "position data capture" block 65. The data from installation data capture block 64 and position data capture block 65 are delivered to an "association" block 66 and therein respectively to a "material properties" block 66.1 and to a "working sector" block 66.2. The data are then directed to memory 31.

For data capture during the installation process, layer structure 61, mix properties 62, compaction data 63, and the pertinent position data can be captured from the road construction machine(s) being used, or their operators, and inputted manually into planning system 30 via input unit 34 shown in FIG. 3. Alternatively thereto, provision can be made that the data are read directly into planning system 30 from the road construction machines via interface 30.1 shown in FIG. 3. The position data are furnished for this purpose preferably by a position detection system, for example a GPS, arranged on the road construction machine. It is also conceivable for an operator of the road construction machine to capture and input its current position. The distance covered during installation, and if applicable also the installation width, are captured electronically, with the result that regions having identical material properties can be defined very accurately. Spatially delimited working sectors within which the material properties of road 20 are identical are created from the position data automatically by the planning system or by input via input unit 34. The relevant material properties of road 20 are ascertained from the installation data of road 20 collected in installation data capture data block 64, and are associated in association block 66 with the working sectors defined by the position data. The working sectors can be described by limited geographic coordinates or by designations of roads or road segments. The material properties are ascertained from the installation data preferably in computation unit 32 shown in FIG. 3. The working sectors and the respectively pertinent material properties are then stored in memory 31. Alternatively, it is possible for the installation data to be associated with the working sectors and stored in memory 31. The installation data then constitute characteristic values 40 correlating with the material properties of road 20.

In an embodiment, a "milling data capture" branch 70 has the capability of ascertaining the necessary material properties during a milling process. Milling data capture branch 70 encompasses a second position data capture block 71, a "manual input" block 72, and a second association block 73 having a second working sector block 73.1 and a second material properties block 73.2. Machine parameters 74 of road milling machine 10 are delivered to a "milling parameter capture" block 75 and forwarded to second material properties block 73.2. In the exemplifying embodiment shown, a milling depth 74.1, a wear 74.2, an advance 74.3, an operating supplies consumption 74.4, and a milling drum rotation speed 74.5 are provided as machine parameters 74. Alternatively, further machine parameters 74 influenced by the material properties of road 20 to be milled can be provided, for example a torque transferred to the milling drum; or only some of machine parameters 74 indicated, or an individual machine parameter 74, can be used.

In the context of performing a milling task, machine parameters 74 specified by an operator, and those resulting therefrom, of a road milling machine 10 that is being used depend on the material properties of road 20 that is to be milled. With a comparatively hard road 20, for example, a higher torque transferred to the milling drum will be needed in order to achieve a specified milling drum rotation speed 74.5, at a specified milling depth 74.1 and a specified advance 74.3, than with a less hard road 20. The material properties of the milled road 20 can thus be ascertained in second material properties block 73.2 from machine parameters 74 collected in milling parameter capture block 75.

Machine parameters 74 can be transferred directly from road milling machine 10 to planning system 30. Alternatively thereto, machine parameters 74 can be inputted in manual input block 72, for example via input unit 34 shown in FIG. 3.

The necessary material properties, or characteristic values 40 correlating therewith, can thus be captured both by data capture during the process of installing a road 20 and by data capture during initial milling work on road 20, and associated with pertinent working sectors. These data can be stored in memory 31 and used for the subsequent planning process.

It is also conceivable to capture the necessary material properties via one or more measurements on road 20 or on the road segment. In all cases, the material properties and the pertinent position data can be manually or automatically captured and manually or automatically transferred into planning system 30. It is also possible for position data to be captured automatically, and for an operator to input manually that spatially delimited region around the captured position data for which the material properties or characteristic values are relevant.

Planning system 30, and the underlying planning method, enable an accurate prognosis of future road milling tasks at least in terms of the expected milling output and expected wear. The prognosis preferably proceeds from correctly adjusted machine parameters 74 during the milling procedure. Knowledge of this data makes possible optimized work organization and construction site fulfillment. Planning system 30 can be centrally arranged or can be provided locally on a road milling machine 10.

What is claimed is:

1. A method for operating one or more road milling machines, encompassing at least the following steps:
   specifying at least two roads and/or road segments to be processed by milling;
   ascertaining at least one expected milling output of each of the one or more road milling machines for the roads and/or road segments to be processed, based on at least one of material properties or characteristic values correlating with the material properties,
   wherein the material properties and/or characteristic values are associated with at least one of road designations, designations of road segments, or geographic coordinates as respectively pertinent to the roads and/or road segments to be processed;
   ascertaining and displaying a sequence, optimized at least with regard to the at least one expected milling output, of the roads and/or road segments to be processed by milling.

2. The method according to claim 1, further comprising determining and displaying, on the basis of the material properties and/or characteristic values associated with the roads and/or road segments to be processed, one or more values selected from a group comprising:
   a working time span;
   an operating supplies consumption;
   a quantity of required consumable parts;
   a quantity of required operating supplies; and
   a quantity of required operating auxiliaries.

3. The method according to claim 1, wherein the sequence is further ascertained based on one or more values selected from a group comprising:
   a working time span;
   an operating supplies consumption;
   a quantity of required consumable parts;
   a quantity of required operating supplies; and
   a quantity of required operating auxiliaries.

4. The method according to claim 1, wherein the material properties for the roads and/or road segments are determined from the characteristic values.

5. The method according to claim 1, wherein the material properties associated with the roads and/or road segments comprise one or more of: an abrasiveness; a hardness; a material type; a material composition; a temperature; and/or a layer structure of the road or road segment.

6. The method according to claim 1, wherein at least one machine parameter of each of the one or more road milling machines which is obtained for processing of each of the roads and/or road segments is determined as at least one of the characteristic values correlating with the respective material properties.

7. The method according to claim 6, wherein the at least one machine parameter comprises a milling depth and/or an advance of the road milling machine and/or a milling drum rotation speed of a milling drum of the road milling machine and/or a torque transferred to the milling drum and/or a drive power transferred to the milling drum or an operating supplies consumption.

8. The method according to claim 7, wherein a wear that has occurred on at least one tool of the road milling machine in the context of milling a specific area is taken into consideration in determining the material properties from the at least one machine parameter.

9. The method according to claim 1, further comprising capturing position data of the road milling machine and associating the captured position data with determined material properties and/or characteristic values.

10. The method according to claim 1, wherein the material properties and/or the characteristic values correlating with the material properties are determined from a process of installing the road or road segment.

11. The method according to claim 1, wherein measured data ascertained with a measurement system are determined as characteristic values correlating with the material properties.

12. The method according to claim 1, wherein transport times of the road milling machine between the roads and/or road segments to be processed, and/or maintenance intervals of the road milling machine, are taken into consideration in the specification of the sequence.

13. The method according to claim 1, wherein a milled area and/or a milled volume and/or a milled mass and/or a milled distance, referred in each case to a time unit, is determined as the at least one expected milling output.

14. A planning system for coordinating road milling tasks for one or more road milling machines, the planning system comprising:
  a memory networked with input and output units associated with the one or more road milling machines; and
  a non-transitory medium having a computer program product stored thereon, the program product executable by a computer to direct the performance of:
    capturing and storing in the memory material properties of roads and/or road segments, and/or characteristic values correlating with the material properties, in association with one or more of respectively pertinent road designations, designations of road segments, or geographic coordinates;
    specifying at least two roads and/or road segments to be processed by milling;
    ascertaining at least one expected milling output of each of the one or more road milling machines for the roads and/or road segments to be processed, based on the material properties and/or characteristic values associated with the roads or road segments;
    ascertaining and outputting a sequence of the roads and/or road segments to be processed by milling, optimized at least with regard to at least one of the at least one expected milling output or wear.

15. The planning system according to claim 14, wherein the program product is further executable to determine and display, on the basis of the material properties and/or characteristic values associated with the roads and/or road segments to be processed, one or more values selected from a group comprising:
  a working time span;
  an operating supplies consumption;
  a quantity of required consumable parts;
  a quantity of required operating supplies; and
  a quantity of required operating auxiliaries.

16. The planning system according to claim 14, wherein the sequence is further ascertained based on one or more values selected from a group comprising:
  a working time span;
  an operating supplies consumption;
  a quantity of required consumable parts;
  a quantity of required operating supplies; and
  a quantity of required operating auxiliaries.

17. The planning system according to claim 14, wherein the determined material properties comprise one or more of: an abrasiveness; a hardness; a material type; a material composition; a temperature; and/or a layer structure of the road or road segment.

18. The planning system according to claim 14, wherein at least one machine parameter of each of the one or more road milling machines which is obtained for processing of each of the roads and/or road segments is determined as at least one of the characteristic values correlating with the respective material properties.

19. The planning system according to claim 18, wherein the at least one machine parameter comprises one or more of: a milling depth of the road milling machine; an advance of the road milling machine; a milling drum rotation speed of a milling drum of the road milling machine; a torque transferred to the milling drum; a drive power transferred to the milling drum; and/or an operating supplies consumption.

20. The planning system according to claim 19, wherein a wear that has occurred on at least one tool of the road milling machine in the context of milling a specific area is taken into consideration in determining the material properties from the at least one machine parameter.

21. The planning system according to claim 14, further comprising capturing position data of the one or more road milling machines and associating the captured position data with the determined material properties and/or characteristic values.

22. The planning system according to claim 14, wherein the material properties and/or the characteristic values correlating with the material properties are determined from the process of installing the road or road segment.

23. The planning system according to claim 14, wherein measured data ascertained with a measurement system are determined as characteristic values correlating with the material properties.

24. The planning system according to claim 14, wherein transport times of the one or more road milling machines between the roads and/or road segments to be processed, and/or maintenance intervals of the one or more road milling machines, are taken into consideration in the specification of the sequence of road milling tasks.

25. The planning system according to claim 14, wherein a milled area and/or a milled volume and/or a milled mass and/or a milled distance, referred in each case to a time unit, is determined as the at least one expected milling output.

26. A method for operating one or more road milling machines, encompassing at least the following steps:
- obtaining and storing in memory material properties of roads and/or road segments, and/or characteristic values correlating with the material properties;
- associating the material properties and/or characteristic values with one or more of respectively pertinent road designations, designations of road segments, or geographic coordinates;
- specifying at least two roads and/or road segments to be processed by milling;
- requesting from memory the material properties and/or characteristic values associated with the roads and/or road segments to be processed by milling;
- ascertaining at least one expected milling output of the road milling machine for the roads and/or road segments to be processed, based on the associated material properties and/or characteristic values associated therewith;
- ascertaining and displaying a sequence of the roads and/or road segments to be processed by milling, optimized at least with regard to at least one of milling output or wear.

* * * * *